(12) United States Patent
Cogley et al.

(10) Patent No.: US 6,951,298 B1
(45) Date of Patent: Oct. 4, 2005

(54) FASTENER DELIVERY APPARATUS

(75) Inventors: Kevin Cogley, Liverpool (GB); Philip John Barfield, Flintshire (GB)

(73) Assignee: Henrob Limited, Flintshire (GB)

( * ) Notice: Subject to any disclaimer, the term of this patent is extended or adjusted under 35 U.S.C. 154(b) by 0 days.

(21) Appl. No.: 09/913,426

(22) PCT Filed: Feb. 14, 2000

(86) PCT No.: PCT/GB00/00472

§ 371 (c)(1),
(2), (4) Date: Mar. 12, 2002

(87) PCT Pub. No.: WO00/47350

PCT Pub. Date: Aug. 17, 2000

(30) Foreign Application Priority Data

Feb. 12, 1999 (GB) .................................... 9903148

(51) Int. Cl.[7] .............................................. B27F 7/13
(52) U.S. Cl. ..................................... 227/147; 227/112
(58) Field of Search ....................... 227/147, 119, 112, 227/117; 221/233; 81/57.37

(56) References Cited

U.S. PATENT DOCUMENTS 2,993,737 A  7/1961  Stephen
3,466,730 A  9/1969  McHenry et al.
3,487,190 A  12/1969  Glorioso et al.
3,906,615 A * 9/1975  Campbell et al. ............. 29/432
5,014,876 A * 5/1991  Young et al. ................ 221/233
5,035,353 A * 7/1991  Smart et al. .................... 227/2
5,480,087 A * 1/1996  Young et al. ................ 227/112
5,524,808 A * 6/1996  Vogrig ......................... 227/147
5,558,264 A * 9/1996  Weinstein .................... 227/10
6,000,596 A * 12/1999 Cariati ........................ 227/112
6,123,245 A * 9/2000  Maltais ........................ 227/119
6,227,437 B1 * 5/2001  Razon et al. ................ 228/254
6,575,347 B2 * 6/2003  Coonrod et al. ............ 227/112

* cited by examiner

*Primary Examiner*—Stephen F. Gerrity
*Assistant Examiner*—Gloria R. Weeks
(74) *Attorney, Agent, or Firm*—DLA Piper Rudnick Gray Cary US LLP

(57) ABSTRACT

A fastener delivery tube (1) is connected between a supply of fasteners, such as rivets (2), and the nose of a fastener setting machine. The delivery tube (1) is connected to an outlet tube (7) of a source of compressed air (3), the outlet tube (7) having an internal bore substantially equal in size to the internal bore of the delivery tube (1). The supply of fasteners is connected to the delivery tube via a feeder tube (9) and transfer gate (4). The transfer gate (4) is sealed so as to prevent leakage of air from the delivery tube (1). The arrangement reduces turbulence in the delivery tube (1) ensures that friction between the fastener (2) and the tube (1) is reduced and permits compressed air to be supplied at significantly lower pressure than has heretofore been possible.

12 Claims, 2 Drawing Sheets

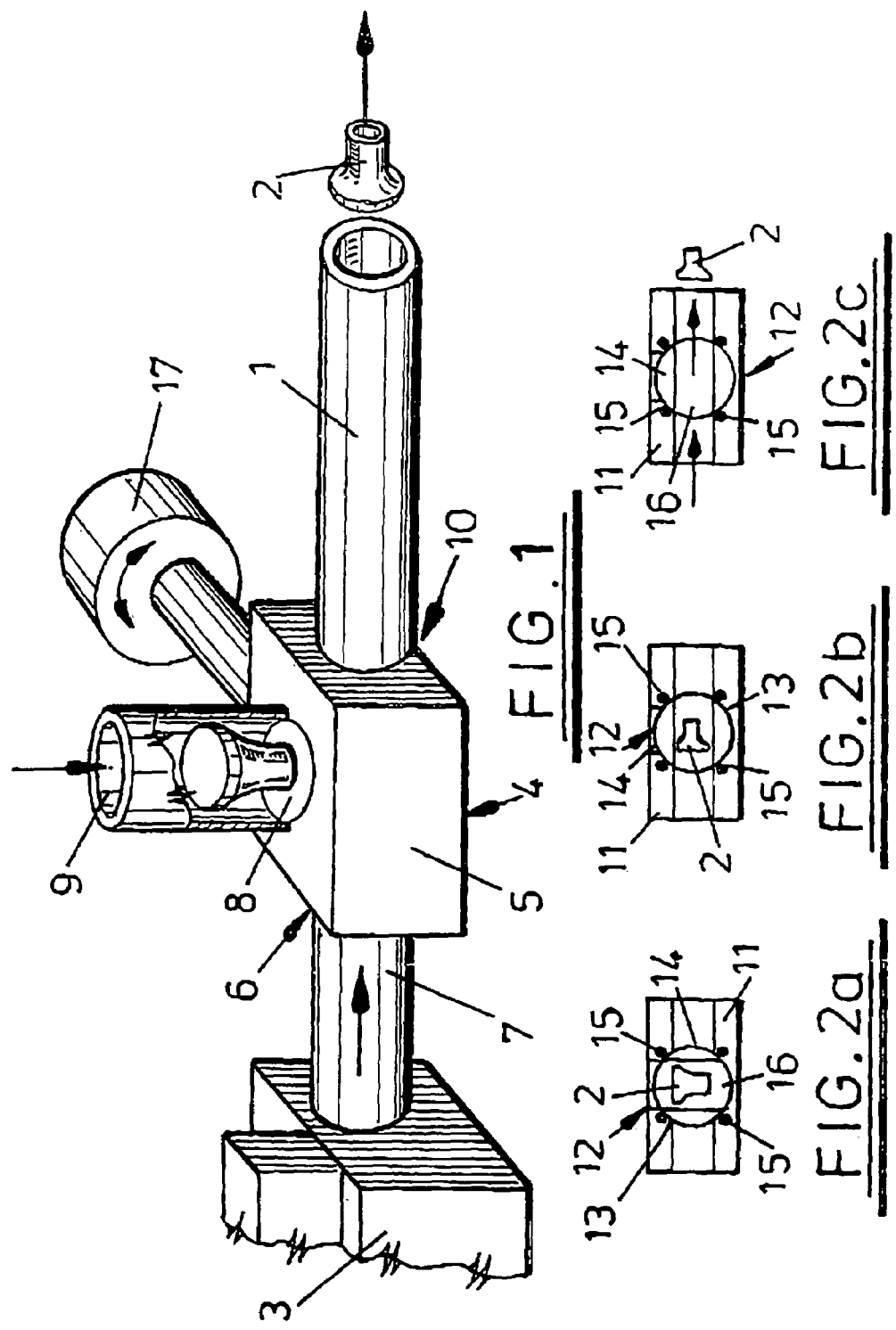

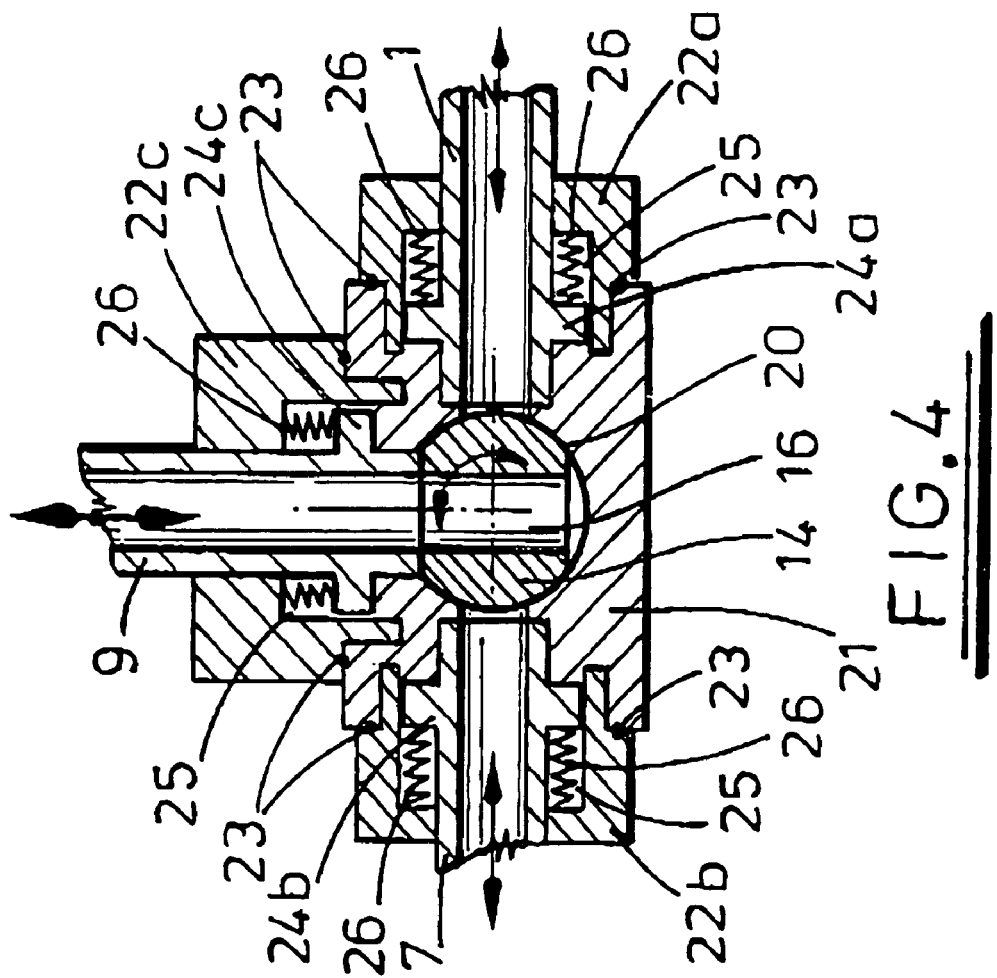
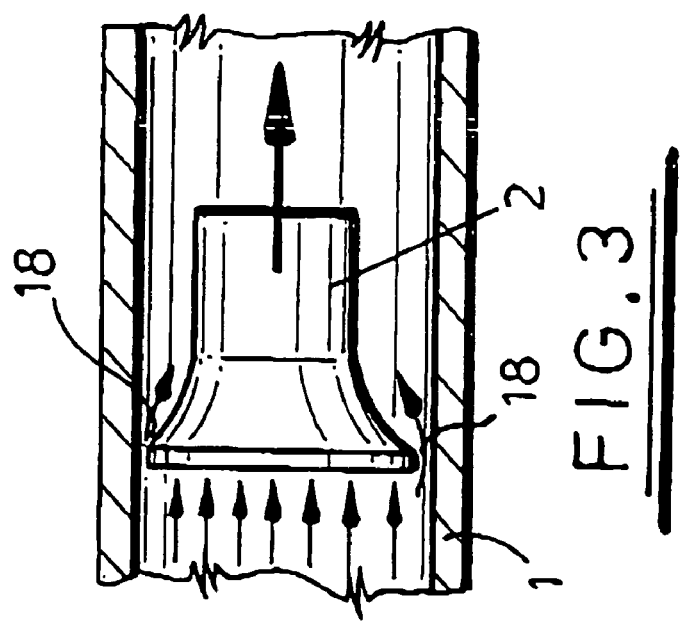

FASTENER DELIVERY APPARATUS

FIELD OF THE INVENTION

The present invention relates to fastener delivery apparatus and more particularly, but not exclusively to delivery apparatus for transferring rivets from a supply to a setting tool of a riveting machine.

BACKGROUND OF THE INVENTION

The term "fastener" is used herein to describe rivets, screws, slugs or other types of fastening devices.

It is well known to distribute rivets or other fasteners (e.g. studs, nuts, bolts) between a supply and a setting tool of a riveting machine or setting tooling within a press by conveying them individually in delivery tubes by compressed air propulsion. A delivery tube of this kind typically has an internal passageway that is configured to conform closely to the shape of the fastener. Additional compressed air may be admitted into the tube at one or more locations along the length of the tube by means, for example, of T-junctions, branch tubes, or elbows connected between a supply of compressed air and the delivery tube, to propel the rivets along the length of the tube.

There are several problems associated with compressed air delivery tubes of the kind described above. First, there is a tendency for fasteners to jam in the tube. This renders the tube inoperable until steps have been taken to clear the blockage. It is often desirable to be able to transport a plurality of fasteners at once along a delivery tube but this significantly increases the tendency to jam. Secondly friction between the fasteners and the tubes causes tube wear. Delivery tubes have to be inspected at regular intervals for wear as a worn tube may be susceptible to blockages or slower feed rates causing increased cycle times. Moreover, wear often results in accumulation in the delivery tube of external dirt, dust or moisture or trace particles of the fastener, fastener coating or tube and they may also cause blockages and slower feed rates.

Compressed air pressure normally decreases along the length of the delivery tube owing to losses (such as for example leaks or friction losses). The desired pressure is generally maintained by supplying further air at booster points (in the form of T-junctions and branch tubes etc.) along the length of the tube and/or by increasing the pressure of the compressed air at source. The increase in air pressure and the addition of booster points increases air turbulence within the tube. If the flow of air is not as smooth as possible there is an increased tendency for fastener jams and the resultant scraping contact can in turn cause wear in the tube. The decreasing air-pressure owing to losses can also cause heavier fasteners to lose momentum so that they fail to reach the end of their journey with sufficient speed unless compressed air booster points are employed.

Existing delivery tubes are often lubricated to ensure that fasteners are transferred at acceptable speeds, and to reduce wear and friction. However, over a period of use the ingress of dirt can result in the tube becoming clogged by a paste comprising the combination of the dirt or trace particles and lubrication oil or moisture.

Known compressed air fastener delivery systems operate at an air pressure of between 5 and 6 bar. This pressure is normally required to ensure sufficient fastener momentum throughout the length of the delivery tube so that it reaches the desired destination despite friction losses or minor obstacles (dirt etc.) in the tube, and/or to accommodate air loss through leakages. A further disadvantage is that known systems may require the continuous application of such air pressure at 5–6 bar to maintain effective performance, as opposed to controlled blasts. Moreover, owing to the above limitations, known systems cannot reliably feed fasteners over long distances, the maximum possible tube lengths being typically 8 m–15 m.

It is an object of the present invention to obviate or mitigate the aforesaid disadvantages and to provide for fastener delivery apparatus that operates at higher transportation speeds, greater distances (typically in excess of 100 m) and lower air pressures (and therefore lower air consumption rate and cost) than currently possible without the use of a lubricant.

SUMMARY OF THE INVENTION

According to the present invention there is provided a fastener delivery apparatus comprising a fastener delivery tube connected between a supply of fasteners and a setting tool of a fastener machine, the tube having an internal cross-section configured to conform substantially to the size and shape of the fastener to be used and connected to a source of pressurized gas, wherein the source of pressurized gas has a supply bore with an interior shape and dimension that is substantially equal to an interior dimension and shape of the delivery tube and wherein the supply of fasteners is connected to the delivery tube via a sealable passage that may be sealed so as to prevent leakage of gas from the delivery tube.

By ensuring that the size and shape of the pressurized gas outlet bore and the delivery tube are matched, there is a significant reduction in turbulence of the pressurized gas. This ensures that the flow of gas remains smooth and laminar thereby preventing fasteners from being thrown against walls of the delivery tube and losing momentum as they travel along the tube. Lubrication of the tube is therefore not required and feeding of a plurality of rivets at once becomes feasible. In addition, the sealed passage reduces the leakage of gas from the apparatus. This feature enables the compressed gas to be supplied at significantly lower pressures, such as 2 bar or less, than is currently possible. The profile of the fastener in the tube provides an effective seal and the smooth laminar flow of the gas reduces its contact with the wall of the delivery tube. In reducing the gas pressure required to transport the rivet the running cost of the apparatus is significantly reduced. Moreover, noise pollution is significantly reduced. The use of a sealed passage provides a barrier against the ingress of dirt and ensures that the pressurized gas supply is used efficiently by directing all of the supplied gas towards the fastener.

Such apparatus also achieves consistent, repeatable minimum transport times for each given design of fastener allowing the full process cycle, e.g. feeding and riveting, to be efficiently implemented at as high a rate as possible.

The present invention lies partly in the realization that the flow rate of the pressurized gas is more important than the gas pressure in transporting fasteners and that it is more efficient to introduce a fastener into the path of a pressurized gas jet rather than to direct the gas towards the fastener in the tube via branch tubes or the like.

The pressure of the pressurized gas is preferably 2 bar or less.

The source of pressurized gas is preferably disposed so that, in use, gas is in coaxial with a longitudinal axis of the tube.

Preferably the sealable passage is sealable by a gate having an internal cross-section that is substantially matched in terms of shape and dimension to the internal cross-section of the delivery tube so as to reduce turbulence or drag to the flow of gas passing it.

The passage is preferably sealed by a transfer gate preferably in the form of a ball valve that is rotatable between a first position in which a aperture in the ball valve is in communication with the supply of fasteners so as to receive at least one fastener and a second position in which the aperture provides a path between the source of pressurized gas and the delivery tube.

Advantageously the delivery tube is of a size such that, in use, there is clearance between the fastener and the tube so as to provide a gas cushion around the fastener. This reduces the friction between the fastener and walls of the delivery tube and also reduces the tendency of the fastener to jam in the tube. These advantages outweigh any reduction of motive force due to air leakage past the fastener.

BRIEF DESCRIPTION OF THE DRAWINGS

Specific embodiments of the present invention will now be described, by way of example only, with reference to the accompanying drawings in which:

FIG. 1 is a perspective view of fastener delivery apparatus of the present invention;

FIGS. 2a to 2c show the operation of a fastener transfer gate in transferring a fastener from a supply into a delivery tube;

FIG. 3 shows a rivet in a delivery tube of the present invention; and

FIG. 4 is a cross-section through a modified embodiment of a fastener transfer gate.

DETAILED DESCRIPTION

Referring now to the FIG. 1 of drawings, there is shown apparatus for transferring rivets from a central rivet supply to the nose of a rivet setting machine (neither of which are shown in the drawings).

The apparatus comprises a rivet delivery tube 1 in which rivets 2 are transported individually or in groups between the supply and the nose of the rivet setting machine, a compressed air supply 3 connected to one end of the delivery tube 1 and a rivet transfer gate assembly 4 disposed in close proximity to the compressed air supply 3. The transfer gate assembly 4 comprises a housing 5 with a first inlet aperture 6 connected to an outlet tube 7 of the compressed air supply 3, a second inlet aperture 8 connected to the end of a feeder tube 9 from the rivet supply and an outlet aperture 10 connected to the delivery tube 1.

The interior of the housing 11, shown in FIGS. 2a to 2c, has a tube portion interconnecting the delivery tube 1 and the outlet tube 7 of the compressed air supply 3. The tube portion incorporates a ball valve assembly 12 comprising a valve seat 13 in which there is disposed a rotatable ball valve 14. The valve seat 13 includes O-ring seals 15 or the like disposed on each side of the ball valve 14.

The ball valve 14 has a central passage 16 and is rotatable, by means of a rotary actuator 17, between a first position in which it is coaxially aligned with the feeder tube 9 and a second position in which it is coaxially aligned with the outlet tube 7 of the compressor supply 3 and the delivery tube 1. In the first position of the ball valve 14 (shown in FIG. 2a) the rivet 2 is able to enter the ball valve passage 16 of the transfer gate assembly 5 from the feeder tube 9.

Rotation of the valve 14 to the second position (shown in FIGS. 2b and 2c) moves the rivet 2 through 90° and seals the feeder tube 9 against communication with the compressed air supply 3. This ensures that the full force of the compressed air (now in communication with the passage 16 in the ball valve 14) is used to propel the rivet 2 into the delivery tube 1 as represented by the arrows in FIG. 2c.

The apparatus is designed such that there is an annular clearance 18 (shown in FIG. 3) between the head of the rivet 2 and the walls of the delivery tube 1. This enables some of the compressed air to pass through the clearance 18 and provides an air cushion between the rivet 2 and the tube 1 to reduce the frictional contact therebetween.

The source of compressed air is disposed so that the path of the air is substantially co-axial with the longitudinal axis of the delivery tube so as to minimise turbulence.

The high flow-rate but low pressure of the air ensures that effective use is made of the air for transporting the rivet.

The cross-section of the bore of the compressed air supply outlet tube 7 is designed to match the size and shape of the interior passage of the delivery tube 1 and the ball valve 14. This ensures that the flow of compressed air is smooth and laminar thereby preventing rivets from being thrown against walls of the delivery tube 1 and losing momentum as they travel along the tube 1. Moreover the internal cross section of the ball valve passage 16 is matched in terms of size and shape to the internal cross-section of the delivery tube for the same reasons.

When the ball valve 14 is rotated to allow the rivet 2 to be blown into the delivery tube 1, it serves to seal the feeder tube 9 from the compressed air supply 3 and thus reduces the leakage of air from the apparatus. This feature enables the compressed air to be supplied at significantly lower pressures, such as 2 bar or less, than those that are currently used.

The profile of the rivet 2 in the delivery tube 1 provides an effective seal and the smooth laminar flow of the air reduces its contact with wall of the delivery tube 1. In reducing the air pressure required to transport the rivet 2 the cost of the apparatus is significantly reduced. Moreover, noise pollution is significantly reduced.

FIG. 4 shows a more detailed embodiment of the transfer gate. The ball valve 14 is mounted in a valve seat 20 defined by a housing body 21 so that it is rotatable in the manner described above. The delivery tube 1, the air supply outlet tube 7 and the fastener feeder tube 9 are all of identical or similar configuration and their ends connect to the transfer gate housing body 21 via interface collars 22a, 22b, 22c which are all of identical design. The interface collars 22a, 22b 22c are designed to mate with complementary formations on the housing body 21 and, once connected, are sealed thereto by seals 23. Each end of the delivery, air supply outlet and feeder tubes 1, 7, 9 has an annular radially outward extending flange 24a, 24b, 24c that is received inside the respective collar 22a, 22b, 22c with an axial clearance 25. Springs 26 are disposed parallel to the axis of the respective tube 1, 7, 9 between the collar 22a, b, c and he flange 24 a, b, c and serve to bias the tubes 1, 7, 9 towards the ball valve 14.

When the passage 16 in the ball valve 14 is coaxial with a particular tube 1, 7, 9 the respective spring 26 biases the tube axially into sealing engagement with the ball valve 14, so that air loss at the junction between the tube 1, 7, 9 and ball valve 14 is significantly reduced or eliminated entirely. The axial clearance enables the tube 1, 7, 9 to deflect axially out of the housing 21 slightly as the ball valve 14 is rotated and comes into contact with it and the springs 26 ensure that the tube 1, 7, 9 move axially back into full sealing engagement when aligned with the ball valve passage 16. Thus the ball valve 14 acts as a cam against the ends of the tubes 1, 7, 9.

The exterior of the tubes 1, 7, 9 and/or collars may be provided with any form of protuberance or other projecting formation that is complementary to a groove or recess in the housing body 21 so as to ensure correct orientation and location of the tube in the housing body. The connection between the tube 1, 7, 9 and housing body 21 is also preferably designed to be a quick-connect coupling, such as, for example, a snap-fit.

In a modified embodiment (not shown) there may be provided an additional source of compressed air or other pressurized gas that is directed over the rivet or rivets in the transfer gate so that the river(s) is cleaned of surface dust or debris etc.

The use of a sealed transfer gate provides a barrier against the ingress of dirt and ensures that the compressed air supply is used efficiently by directing all of the supplied air towards the fastener. It also enables a plurality of fasteners to be delivered at once with reduced risk of jamming.

It will be appreciated that numerous modifications to the above described design may be made without departing from the scope of the invention as defined in the appended claims. For example, the transfer gate need not be in the form of a ball valve but may take other forms and may be operated automatically provided that the compressed air supply is sealed from the feeder tube when the rivet is being propelled into and along the delivery tube.

It is to be understood that although the exemplary fastener delivery apparatus has a compressed air supply, and that any suitable supply of pressurized gas can be used. Moreover, although the rivet is shown in FIG. 3 as being transported axially, the principles described above apply equally to a rivet that it transported sideways through a tube having an internal profile that is T-shaped.

What is claimed is:

1. A fastener delivery apparatus for connection to a setting tool of a fastener machine comprising:
    a fastener delivery tube and a fastener supply;
    the delivery tube being connected to the fastener supply and being connectable to the setting tool;
    the delivery tube having a bore that defines an internal cross-section profile configured to conform substantially to the size and shape of the fastener to be used;
    a source of pressurized gas having an outlet that is connected to and coaxial with the delivery tube and configured to supply pressurized gas through the bore of said tube so as to propel fasteners along said tube towards the setting tool;
    said outlet having a bore with an interior cross sectional area that is substantially identical to said internal cross-section profile of the delivery tube bore;
    a movable transfer passage disposed between the outlet of the source of pressurized gas and an inlet of the delivery tube for transferring a fastener between the fastener supply and the delivery tube, the passage being in line with the outlet of the gas source and said inlet of the delivery tube;
    sealing means contacting the transfer passage for sealing the passage so as to prevent leakage of gas from the apparatus.

2. The fastener delivery apparatus according to claim 1, wherein the pressure of the pressurized gas is 2 bar or less.

3. The fastener delivery apparatus according to claim 1, wherein source of pressurized gas is disposed so that, in use, the path of the gas is coaxial with a longitudinal axis of the tube.

4. The fastener delivery apparatus according to claim 1, wherein the transfer passage is sealable by a gate having an internal cross-section that is substantially matched in terms of shape and dimension to the internal cross-section of the delivery tube so as to reduce turbulence or drag to the flow of gas passing it.

5. The fastener delivery apparatus according to claim 1, wherein the delivery tube is of a size such that, in use, there is a clearance between the fastener and the tube so as to provide a gas cushion around the fastener.

6. The fastener delivery apparatus according to claim 1, wherein the delivery tube has a projecting formation.

7. A fastener delivery apparatus for connection to a setting tool of a fastener machine comprising:
    a fastener delivery tube and a fastener supply;
    the delivery tube being connected to the fastener supply and being connectable to the setting tool;
    the delivery tube having a bore that defines an internal cross-section profile configured to conform substantially to the size and shape of the fastener to be used;
    a source of pressurized gas having an outlet that is connected to and coaxial with the delivery tube and configured to supply pressurized gas through the bore of said tube so as to propel fasteners along said tube towards the setting tool;
    said outlet having a bore with an interior cross sectional area that is substantially identical to said internal cross-section profile of the delivery tube bore;
    a rotatable transfer passage disposed between the outlet of the source of pressurized gas and an inlet of the delivery tube for transferring a fastener between the fastener supply and the delivery tube, the passage being in line with the outlet of the gas source and said inlet of the delivery tube;
    sealing means contacting the transfer passage for sealing the passage so as to prevent leakage of gas from the apparatus.

8. The fastener delivery apparatus according to claim 7, wherein the pressure of the pressurized gas is 2 bar or less.

9. The fastener delivery apparatus according to claim 7, wherein source of pressurized gas is disposed so that, in use, the path of the gas is coaxial with a longitudinal axis of the tube.

10. The fastener delivery apparatus according to claim 7, wherein the transfer passage is sealable by a gate having an internal cross-section that is substantially matched in terms of shape and dimension to the internal cross-section of the delivery tube so as to reduce turbulence or drag to the flow of gas passing it.

11. The fastener delivery apparatus according to claim 7, wherein the delivery tube is of a size such that, in use, there is a clearance between the fastener and the tube so as to provide a gas cushion around the fastener.

12. The fastener delivery apparatus according to claim 7, wherein the delivery tube has a projecting formation.

* * * * *